United States Patent
Patodia et al.

(10) Patent No.: US 11,743,337 B2
(45) Date of Patent: *Aug. 29, 2023

(54) DETERMINING PROCESSING WEIGHTS OF RULE VARIABLES FOR RULE PROCESSING OPTIMIZATION

(71) Applicant: PAYPAL, INC., San Jose, CA (US)

(72) Inventors: Prabin Patodia, Bangalore (IN); Shikha Gupta, Bangalore (IN); Sumit Kumar, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,032

(22) Filed: Nov. 30, 2021

(65) Prior Publication Data

US 2022/0086233 A1     Mar. 17, 2022

Related U.S. Application Data

(63) Continuation of application No. 17/009,626, filed on Sep. 1, 2020, now Pat. No. 11,245,766.

(51) Int. Cl.
  *H04L 67/125*  (2022.01)
  *H04L 67/00*   (2022.01)
  *G06N 20/00*   (2019.01)

(52) U.S. Cl.
  CPC ........... *H04L 67/125* (2013.01); *G06N 20/00* (2019.01); *H04L 67/34* (2013.01)

(58) Field of Classification Search
  CPC ....... H04L 67/125; H04L 67/34; H04L 67/51; G06N 20/00
  See application file for complete search history.

(56) References Cited

U.S. PATENT DOCUMENTS

| | | | | |
|---|---|---|---|---|
| 5,119,318 A | * | 6/1992 | Paradies | ............... G06N 5/04 706/904 |
| 5,253,189 A | | 10/1993 | Kramer | |
| 5,701,400 A | | 12/1997 | Amado | |
| 6,477,520 B1 | * | 11/2002 | Malaviya | ............... G06N 5/022 704/8 |
| 6,513,024 B1 | * | 1/2003 | Li | ............... G06N 20/00 706/45 |
| 7,313,552 B2 | | 12/2007 | Lorenz et al. | |

(Continued)

*Primary Examiner* — Michael Won
(74) *Attorney, Agent, or Firm* — Haynes and Boone, LLP

(57) ABSTRACT

There are provided systems and methods for determining processing weights of rule variables for rule processing optimization. A service provider, such as an electronic transaction processor for digital transactions, may utilize different decision services that implement rules for decision-making of data including real-time data in production computing environments. Rules may correspond to coded statements that perform an automated decision-making service for the computing services and platforms of the service provider. When writing rules, different variables for data objects may be utilized, where each variable may perform a different operation and/or utilize a different operation for fetching and retrieving data used during rule processing. Each variable may therefore have a different data processing weights based on processing requirements of the data. Thus, optimization of rule authoring may be performed by mapping variables to other similar variables and showing a processing weight of each variable.

20 Claims, 5 Drawing Sheets

(56) References Cited

U.S. PATENT DOCUMENTS

| | | | | |
|---|---|---|---|---|
| 9,443,192 | B1* | 9/2016 | Cosic | G06N 3/006 |
| 2001/0049717 | A1* | 12/2001 | Freeman | H04L 67/1034 |
| | | | | 709/203 |
| 2006/0037000 | A1* | 2/2006 | Speeter | G06F 8/71 |
| | | | | 717/120 |
| 2006/0143144 | A1* | 6/2006 | Speeter | H04L 67/10 |
| | | | | 706/47 |
| 2006/0149408 | A1* | 7/2006 | Speeter | G06F 8/71 |
| | | | | 700/126 |
| 2006/0241961 | A1* | 10/2006 | Tsyganskiy | G06Q 10/067 |
| | | | | 705/348 |
| 2007/0239471 | A1 | 10/2007 | Patton et al. | |
| 2009/0119584 | A1* | 5/2009 | Herbst | G06F 16/36 |
| | | | | 715/825 |
| 2013/0031566 | A1 | 1/2013 | Sureshan et al. | |
| 2014/0195473 | A1* | 7/2014 | Citeau | G06N 5/025 |
| | | | | 706/47 |
| 2015/0279182 | A1 | 10/2015 | Kanaujia et al. | |
| 2016/0127319 | A1* | 5/2016 | Xiong | H04L 63/1425 |
| | | | | 726/1 |
| 2021/0012028 | A1* | 1/2021 | Cabot | G06F 17/18 |
| 2021/0374569 | A1* | 12/2021 | Jezewski | G06N 20/00 |
| 2022/0086233 | A1* | 3/2022 | Patodia | G06N 20/00 |
| 2022/0335348 | A1* | 10/2022 | Miller | G06Q 10/0635 |

* cited by examiner

Autogenerated Vocab Mapping based on Variable Definition 310

| Variable 320 | Mapped Variable 330 |
|---|---|
| Var2 322 | Var1 321 |
| Var3 323 | Var1 321 |
| Var5 325 | Var4 324 |

FIG. 3A

| Variable 320 | Load Mechanism 340 | Time to Load 350 | Time to Transform 360 | Space Complexity Factor 370 | Final Weight 380 | Var Occurrence in Rules 390 |
|---|---|---|---|---|---|---|
| Var1 321 | Cache | 20ms | 30ms | 5 | 1 | 255 |
| Var2 322 | DB | 50ms | 20ms | 4 | 2 | 195 |
| Var3 323 | Multiple DB Call | 150ms | 30ms | 3 | 3 | 75 |
| Var4 324 | Single Service Call | 200ms | 10ms | 3 | 4 | 25 |
| Var5 325 | Multiple Service Call | 200ms | 20ms | 3.5 | 4.5 | 85 |

FIG. 3B

DETERMINING PROCESSING WEIGHTS OF RULE VARIABLES FOR RULE PROCESSING OPTIMIZATION

CROSS REFERENCE TO RELATED APPLICATION

The present invention is a Continuation of U.S. patent application Ser. No. 17/009,626, filed Sep. 1, 2020, the disclosure of which is incorporated herein by reference in its entirety.

TECHNICAL FIELD

The present application generally relates to optimizing construction of data processing rules and more particularly to determining data processing requirements and system weights for different data objects and variables.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. During use of these computing services, the processing platforms and services, the service provider may utilize one or more decision services that implement and utilize rules for decision-making in real-time data processing, such as within a production computing environment. For example, a data processing rule may correspond to an expression or argument written in computing code and executable processes that allow for processing data and determining a decision, which may be constructed by one or more users or other rule authoring entities. These rules may be written in a specific vocabulary and grammar for data objects within the rule, utilized for different operations for fetching and retrieving data, as well as used to enter data into the rule for data processing. However, different operations may be used to retrieve and/or process the same data, which may have different processing loads and times with the system. Thus, rules may not use optimized vocabulary and grammar during rule construction by the rule authoring entities and the rule may unnecessarily consume processing resources and time.

BRIEF DESCRIPTION OF THE DRAWINGS

FIG. 3A is an exemplary diagram of table showing variables used for rule authoring and construction mapped to other variables for rule authoring optimization, according to an embodiment;

FIG. 3B is an exemplary diagram of table showing variables weights and additional data processing parameters for optimizing rule authoring and processing, according to an embodiment;

Figure 1:
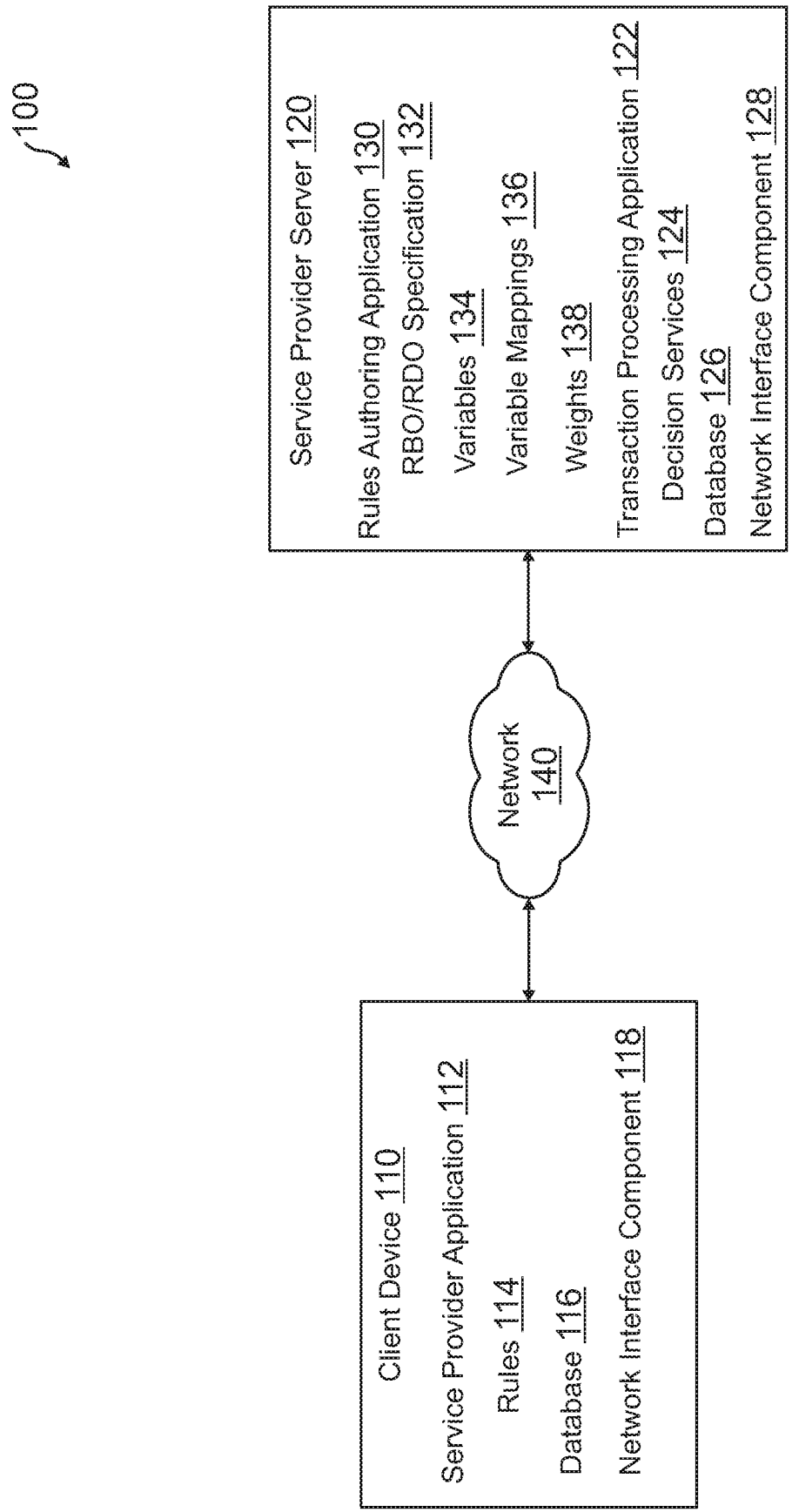
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for determining processing weights of rule variables for rule processing optimization. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. For example, an online transaction processor may provide services associated with electronic transaction processing, including account services, user authentication and verification, digital payments, risk analysis and compliance, and the like. These services may further implement automated and intelligent decision-making operations and engines, including data processing rule engines that automate certain decision-making based on rules designated for the systems. These decision services may be used for authentication, risk analysis, fraud detection, and the like to determine if, when, and how a particular service may be provided to users. For example, risk rules may be utilized by a risk engine to determine whether electronic transaction processing of a requested digital transaction may proceed or be approved. The risk engine may therefore determine whether to proceed with processing the transaction or decline the transaction (as well as additional operations, such as request further authentication and/or information for better risk analysis).

These decision services include rules written using a rule vocabulary, referred to as a rule business object (RBO) or rule data object (RDO) specification. The RBO/RDO specification corresponds to a vocabulary used to write rules and includes one or more variables associated with data objects that may be used to construct and author a rule. Each variable's data object therefore fetches, retrieves, and loads particular data (e.g., one or more pieces of account data, device data, user data, transaction data) that is utilized in rule processing of the rule and decision-making. Thus, a variable may correspond to a piece or portion of data for processing, which may correspond to a data object that obtains specific data from a certain resource. For example, a variable and/or a data object may correspond to account information, where the available data objects that request, determine, or retrieve account information may include an account number, username, user information, user/account identifier, and the like. When writing rules, a rule authoring application may be utilized by a rule author in order to designate one or more variables for data objects for a rule. Thereafter, a rule may be implemented and/or deployed to the decision services of the service provider for intelligent decision-making.

The vocabulary for a RBO/RDO specification may include multiple different variables for data objects, and may be updated over time to include new variables. For example, new variables and/or data objects may be implemented, such as a new variable for a different piece or portion of account information, user information, transaction information, or the like, as well as new data objects for new or existing variables (e.g., for account information, a data object to obtain the corresponding name data from a different resource). Thus, each variable may have a different operation to retrieve data and load the data in the rule, such as by obtaining the data for a local short-term cache, a database system, user input, and the like, as well as the operations to load the data to the rule. However, two or more variables may be correlated in that they retrieve and load the same data object or other piece of data to the rule. These correlated variables may have different processing costs, weights, loads, and/or times, which may affect the amount of time for a rule to determine a decision, as well as the computing resources that the rule consumes when performing decision-making. In this regard, rule authors may not select the most optimized variable for rule authoring and construction, thereby wasting system resources and/or increasing rule data processing times.

To address this problem, the service provider may utilize a variable mapping system for a rule authoring application used to author and construct the rules that are deployed to runtime rule decision services. When a vocabulary writer that generates and provides the variables for the rule authoring application provides an RBO/RDO specification, and/or updates a specification with additional variables, the service provider may execute one or more operations to map the variable to any other similar variables that load the same or similar data as a data object in a rule. Once the mapping is determined, a weight of each variable may be determined, which may correspond to the processing costs, resources used, loads, and/or times for execution of each variable's data object for data retrieval and loading during rule execution. An application logging operation may operate on authored rules being utilized by one or more decision services in order to determine parameters and attributes for variables, such as the time to load, time to transform, space complexity, load mechanism, variable usage, and the like. The central application logging operation may then provide this data as the variables statistics used to determine the weights of different variables. Thereafter, the mapping (having the weights) is output to the rule authoring application and/or one or more vocabulary repositories for use with analysis of the variables and optimized rule authoring.

In order to determine the mappings of variables to other variables that perform the same or similar function (e.g., load the same or similar data to a rule for rule execution and data processing by decision services), the service provider may parse and/or analyze the variables for one or more RBO/RDO specifications. In this regard, the variables may be parsed to determine a correlation based on the functioning of the variables and the corresponding data objects for data loading to rule. In certain embodiments, one or more correlation identifiers (IDs) may be used in order to correlate different variables to each other based on the corresponding functions and data objects of the variables. Additionally, the underlying data that is loaded to the rule may be analyzed to determine if two or more variables are performing the same or similar function. For example, the same data (e.g., an account identifier, user name, transaction amount, transaction location, device IP or MAC address, device fingerprint, etc.) may be loaded to a rule from two or more different sources. Thus, two or more variables may perform the same function by loading the same data, but do so from different sources (e.g., local cache, remote database, user input, network device, etc.).

Moreover, each variable may include a corresponding definition and/or description, which may define the function of the variable and the data loaded to the rule for rule processing by the variable. The definition and/or description may be parsed in order to correlate different terms, identifiers, phrases, and the like. For example, a natural language processor and/or machine learning (ML) or other artificial intelligence (AI) system may be used to correlate different terms, phrases, functions, data objects, operations, and the like between different variables to determine linked variables and a corresponding mapping that maps one or more variables to one or more other variables. An AI system may be trained in order to parse and correlate different variables, for example, by providing training data showing pairs or other correlations of two or more variables and generating classifiers and other outputs that allow for clustering and/or linking of variables that perform the same or similar functions and/or operate on the same or similar data objects. In some embodiments, a mapping of one or more variables to one or more other variables in a specification's vocabulary may be determined based on precomputed correlations in the service provider system. Further, an administrator or other vocabulary writer may also provide correlations and a mapping between different variables.

Thereafter, once a mapping table is determined that shows one or more variables mapped to one or more other variables, weights and/or a weight table may be determined and/or added to the mapping table in order to show the overall processing weight and cost of each variable. The weights may therefore be used to show an optimized variable for selection during rule authoring and/or updating and optimizing a rule after construction, where the optimized variable may correspond to a lowest weight or most beneficial weight (e.g., lowest time to load, time to transfer, or the like). Each variable may be monitored during runtime, such as in a production data environment, and/or based on testing the variables using test data (e.g., exemplary data and/or resources used to load data to a rule). This may be used to determine different parameters and/or statistics for variable usage in a rule for data processing by a decision service. For example, a weight may be calculated as a weighted average, score, or value of different variable parameters and statistics for variable use and execute, such as a time to load, time to transform, space complexity, load mechanism, variable usage, and the like. For example, a time to load may be measured as an amount of time in milliseconds (ms) or the like that may be required to load data into a rule for data processing by the rule in a decision service. Thus, each parameter may be provided a different percentage, factor, or weight in determination of the overall variable weight. Each variable may then be associated with a weight in a separate table and/or the mapping table.

Thereafter, variables may be compared based on their corresponding weights. For example, with two or more linked variables that perform the same or similar function, an optimized variable may be determined based on a lowest or best weight factor for each of the linked variables. This allows the mapping table or other table (e.g., the weight table) to show a most optimized variable for selection in rule construction based on the data processing costs and/or requirements of each of the linked variables. Thereafter, when a rule author utilizes the rule authoring application, the rule author may see the different variables and other variables mapped to those variables. The rule authoring application may further provide one or more user interfaces that display the mapping of variables to other similar variables that perform the same or similar functions, as well as the weights (and other statistics) associated with each variable. Furthermore, when a rule is being authored and a variable is selected and/or entered into a rule, the rule authoring application may display the other related variables linked to the selected variable by the rule author, as well as the optimized variable and/or variable weights so that the rule author may make optimized selections during rule authoring and construction.

In various embodiments, the rule authoring application and/or another rule optimization application or operation may receive a written and/or constructed rule for analysis. The optimization operation may utilize the mapping and/or weights of the variables with the rule to determine an optimization of the rule based on the optimized variable (e.g., optimized processing cost and/or weights) selection of the variables within the rule. The optimization operation may parse the rule and the variables within the rule to determine the optimization that reduces the processing load or cost of the rule based on interchanging or replacing one or more variables with one or more optimized variables from the mapping and weights. In some embodiments, optimization may also be based on a combination of one or more variables. For example, a combination of variables may correspond to a lower processing cost or load where two or more variables may work in conjunction to have a lower load than if the variables were executed independently. In this regard, where a single API call and/or resource may be used by two or more variables, the processing cost/load may be lower than if those variables operate on different resources or perform separate API calls. Once the optimized variable selection is performed, the rule may be set and constructed for deployment with one or more rule services, such as in a rule package. Further, the optimization operation for variables within rules may also retroactively analyze rules that have previously been deployed into one or more decision services in order to optimize production and/or in-use rules in decision services.

Thereafter, a service provider, such as an online transaction processor may provide services to users, including electronic transaction processing, such as online transaction processors (e.g., PayPal®) that allows merchants, users, and other entities to processes transactions, provide payments, and/or transfer funds between these users. When interacting with the service provider, the user may process a particular transaction and transactional data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user. In further embodiments, other service providers may also provide computing services, including social networking, microblogging, media sharing, messaging, business and consumer platforms, etc. These computing services may be deployed across multiple different applications including different applications for different operating systems and/or device types. Furthermore, these services may utilize the aforementioned decision services having the rules optimized based on variable mappings and weights.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. Access and use of these accounts may be performed in conjunction with uses of the aforementioned decision services.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140 including those associated with rule authoring and deployment of rules for use in decision services. In this regard, client device 110 may be used to access a rule authoring application that includes a vocabulary for a specification of variables used to construct one or more rules. Service provider server 120 may provide optimization of variables in rule authoring such that weights of the different variables may be used to determine an optimized variable based on processing load or cost for each variable.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a service provider application 112, a database 116, and a network interface component 118. Service provider application 112 may correspond to executable processes, procedures, and/or applications with associated hardware. In other embodiments, client device 110 may include additional or different modules having specialized hardware and/or software as required.

Service provider application 112 may correspond to one or more processes to execute software modules and associated components of client device 110 to provide features, services, and other operations for writing and constructing rules for service provider server 120 using variables for an RBO/RDO specification used by service provider server 120. In this regard, service provider application 112 may correspond to specialized hardware and/or software utilized by a user of client device 110 that may be used to access a website or UI provided by service provider server 120. Service provider application 112 may utilize one or more UIs, such as graphical user interfaces presented using an output display device of client device 110, to enable the user associated with client device 110 to enter and/or view data, navigate between different data, UIs, and executable processes, and request processing operations based on services for rule authoring provided by service provider server 120. In some embodiments, the UIs may display variables for a vocabulary in a rule construction specification, such as an RBO/RDO specification. In order to do this, service provider application 112 may render a UI during application execution, which may correspond to a webpage, domain, service, and/or platform provided by service provider server 120.

In some embodiments, rules constructed using service provider application 112 may include rules for decision-making used in electronic transaction processing provided by service provider server 120. However, in further embodiments, different services may be provided that utilize rules constructed using service provider application 112, including messaging, social networking, media posting or sharing, microblogging, data browsing and searching, online shopping, and other services available through online service providers. Thus, service provider application 112 may display one or more operations for rule construction, which may utilize variables provided in service provider application 112. When constructing rules, service provider application 112 may further display a mapping of variables to other variables that perform the same or similar task, operation, or function, such as by retrieving the same data for a data object from a different resource or using a different load mechanism. The mapping may further show a weight or processing cost of each variable, and further during rule construction, the rule may be analyzed, and optimized variables may be displayed to reduce a processing cost or weight of the rule based on replacements of one or more variables.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with service provider application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 116 may include information for writing and constructing rules 114, such as data that may be displayed through one or more user interfaces that allow selection and viewing of different variables used in rule construction.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide services that use data processing rules with decision services to perform automated decision-making in an intelligent system. In this regard, service provider server 120 includes one or more processing applications which may be configured to interact with client device 110 to generate and deploy rules having optimized variable selection based on data processing and system resource usage weights of the variables. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a rule authoring application 130, a transaction processing application 122, a database 126, and a network interface component 128. Rule authoring application 130 and transaction processing application 122 may correspond to executable processes, procedures, and/or applications with associated hardware. In other embodiments, service provider server 120 may include additional or different modules having specialized hardware and/or software as required.

Rule authoring application 130 may correspond to one or more processes to execute modules and associated specialized hardware of service provider server 120 to provide a platform and framework to generate rules used in decision services used by one or more applications, services, and/or platforms of service provider server 120 during use of services and resources provided by service provider server 120. In this regard, rule authoring application 130 may correspond to specialized hardware and/or software used by service provider server 120 to first generate mappings of variables to other similar variables in functionality, for example, based on the corresponding data objects for the variables. In this regard, rule authoring application 130 may access an RBO/RDO specification 132 having variables 134 that correspond to different operations or processes to load data from one or more resources into a rule or coded expression, such as rules 114 constructed by client device 110. Rules 114 may be used for decision-making in one or more other applications, such as transaction processing application 122 having decision services 124 used for automated decision-making using rules 114.

Using variables 134 for RBO/RDO specification 132, rule authoring application 130 may determine variable mappings 136 corresponding to mapping tables that map one or more variables to one or more corresponding variables based on the same or similar functionality of the variables. For example, a first variable of variables 134 may correspond to a specific data object to load data to a rule, such as a first name for an account holder. This may be done from a database resource, cache, user input, or processing operation such that a second variable of variables 134 may provide the same data but from a different resource. Thus, the first and second variables may be mapped to each other and linked within a mapping table of variable mappings 136. This may be determined by parsing variables 134 and corresponding data, operations, and/or descriptions. Additionally, variable mappings 136 may be determined using an AI or machine learning system trained to detect similarities in variables 134 and/or group or cluster variables 134. One or more administrators or variable authors may also review and/or make associations between different ones of variables 134.

Thereafter, rule authoring application 130 may determine weights 138 that may be associated with each of variables 134. Weights 138 may correspond to a weighted average, score, or value based on variable parameters or statistics. Weights 138 may be determined by determining the score from a time to load, time to transform, space complexity, load mechanism, variable usage, and the like for each of variables 134. For example, a time to load may be measured as an amount of time in milliseconds (ms) or the like that may be required to load data into a rule for data processing by the rule in a decision service. Weights 138 may be associated with each of variables 134 in variable mappings 136 so that different variables may be compared and a most optimized variable (e.g., based on weights 138) may be determined for rule authoring in order to reduce a rule's processing cost, resources used, and/or time to execute. Variable mappings 136 and weights 138 may be output during rule authoring through rule authoring application 130 and/or used when optimizing one or more existing or newly authored rules. Once a rule is authored, it may be implemented in and deployed to transaction processing application 122, such as in decision services 124.

Transaction processing application 122 may correspond to one or more processes to execute modules and associated specialized hardware of service provider server 120 to process a transaction, which may be assisted by rule authoring application 130 in generating rules used by decision services 124 to decision-making during the services of transaction processing application 122. In this regard, transaction processing application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account.

The payment account may be accessed and/or used through a browser application and/or dedicated payment application executed by client device 110 and engage in transaction processing through transaction processing application 122, such as service provider application 112 that displays UIs from service provider server 120. Transaction processing application 122 may process the payment and may provide a transaction history to client device 110 for transaction authorization, approval, or denial. Such account services, account setup, authentication, electronic transaction processing, and other services of transaction processing application 122 may utilize decision services 124, such as for risk analysis, fraud detection, and the like. Thus, decision services 124 may implement rules written by and deployed from rule authoring application 130, for example, based on interactions and rule construction requests performed by client device 110. These rules may be optimized by rule authoring application 130 using variable mappings 136 and weights 138 for variable optimization on processing loads and costs.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store data necessary for rule authoring application 130, including RBO/RDO specification 132 having variables 134, as well as variable mappings 136 and weights 138 for use in rule optimization based on processing weights of variables 134.

In various embodiments, service provider server 120 includes at least one network interface component 128 adapted to communicate client device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
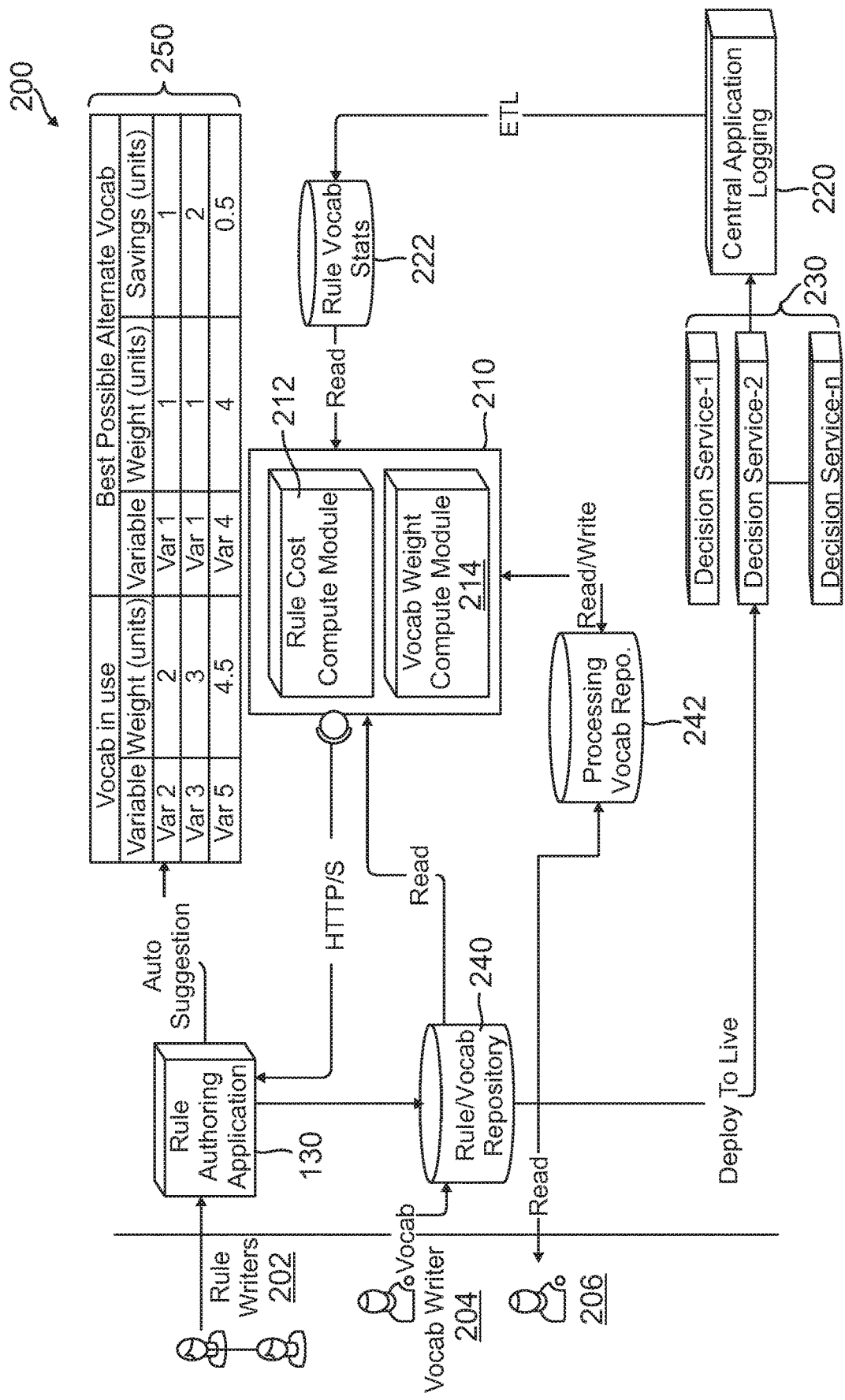
FIG. 2 is an exemplary system environment where rule variables are mapped to other rule variables for rule authoring and processing optimization based on variable weights, according to an embodiment.

FIG. 2 is an exemplary system environment 200 where rule variables are mapped to other rule variables for rule authoring and processing optimization based on variable weights, according to an embodiment. System environment 200 of FIG. 2 includes rule authoring application 130 discussed in reference to system 100 of FIG. 1, which may be executed by service provider server 120 when providing rule authoring and construction services to one or more users for use in generating and deploy rules to decision services of the service provider, such as decision services 124. In this regard, rule writers 202 may utilize a computing device to request operations, navigate between UIs and data, and otherwise interact with service provider server 120 for rule authoring, for example, using client device 110 discussed with respect to system 100.

System environment 200 shows how rule authoring application 130 may be used to provide optimized rule authoring based on mapped variables and each variable's corresponding processing load, cost, or weight. Rule writers 202 may access rule authoring application, which includes a vocabulary of terms and a grammar used for rule writing and construction. When utilizing rule authoring application, a rule optimization application 210 may be used to generate a variable mapping table 250 that is used to show a mapping of variables within a certain RBO/RDO specification to other variables within the specification. Further, variable mapping table 250 shows weights of each variable (e.g., as a weighted measure of each variable's processing cost, time, resource consumption, or the like) so that a savings may be shown for optimization of variable selection in rule authoring. This allows for optimization of rule writing so that rules utilize the best and/or most efficient variables in terms of processing weight on the service provider's computing systems, platforms, and architecture.

In order to provide variable mapping table 250, rule optimization application 210 executes a rule cost compute module 212 and a vocab weight compute module 214 based on data from central application logging 220. For example, central application logging 220 may monitor decision services 1-n 230, where each of decision services 1-n 230 utilize one or more rules for data processing and decision-making in runtime or a production computing environment (e.g., with production data, such as data from one or more end users that utilize the service provider's systems and computing services, such as electronic transaction processing through one or more digital accounts). When monitoring decision services 1-n 230, central application logging 220 may track each variable's time to load, time to transform, space complexity, load mechanism, variable usage, and the like for an RBO/RDO specification corresponding to a vocabulary used for rule authoring. Thereafter, the statistics for each variable is stored by rule vocab stats 222, that may be read by rule optimization application 210. For example, rule vocab stats 222 may correspond to a database and/or database tables that includes statistics and other usage data for each variable when utilized by a rule to load and/or process data in a rule. Further, rule vocab stats 222 may store other data associated with processing costs and system weights for variables in the corresponding specification.

Thereafter, rule optimization application 210 may read data from rule vocab stats 222 and a rule/vocab repository 240 in order to generate variable mapping table 250. Vocab weight compute module 214 may correspond to a data preprocessing operation and module that may preprocess data for variables from rule vocab stats 222 and rule/vocab repository 240 (e.g., not in runtime so that variable mapping table may be pre-processed and generated for rule optimization based on selecting variables to reduce weights on the computing system). For example, vocab weight compute module 214 may read data from rule vocab stats 222 and rule/vocab repository 240 to determine a mapping of variables to other variables having the same or similar function (e.g., based on parsing data objects, loaded data, and/or variable descriptions or identifiers). The vocabulary includes variables in the RBO/RDO specification that are generated by a vocab writer 204. Vocab writer 204 may initially establish the variables, as well as update the specification and publish new variables to the corresponding specification, which may be stored by rule/vocab repository 240 when vocab writer writes and updates the variable specification. Thereafter, rule/vocab repository 240 may be read by rule optimization application 210 for use in determining variable mapping table 250, as well as optimizing rule construction through corresponding variables and variable suggestions (e.g., based on processing weights of mapped variables).

In some embodiments, one or more correlations between two or more variables may be based on the functioning of the variables and the corresponding data objects. Correlation IDs may be used with variables and/or underlying data that is loaded to a rule (e.g., an account identifier, user name, transaction amount, transaction location, device IP or MAC address, device fingerprint, etc.) to determine if variables are correlated and performing the same or similar function. However, the variables may perform that function for data loading and/or processing in different ways, such as by loading from a different resource (e.g., local cache, remote database, user input, network device, etc.). When parsing a definition and/or description, an ML or another AI system may be used to correlate different terms, phrases, functions, data objects, operations, and the like between different variables. Thus, vocab weight compute module 214 may include one or more intelligent systems, which may be trained in order to parse and correlate different variables. This may include generating classifiers and other outputs that allow for clustering and/or linking of variables that perform the same or similar functions and/or operate on the same or similar data objects. In some embodiments, vocab weight compute module may utilize precomputed correlations and/or vocab writer 204 or a service owner 206 may also provide correlations and a mapping between different variables for use with variable mapping table 250.

Vocab weight compute module 214 may then utilize the data from rule vocab stats 222 to assign each variable a weight in variable mapping table 250, such as based on the time to load, time to transform, space complexity, load mechanism, and/or variable usage. The weights assigned in variable mapping table 250 may correspond to some weighted average, calculation or score based on assigning different weights to each statistic or other variable processing parameters, and generating an overall weight corresponding to the processing cost, time, or resources used by the variable during rule execution. Once the weights are determined, each variable may be mapped to their corresponding variables (e.g., achieving the same function), and a savings or cost of replacing or interchanging the variables may be shown in variable mapping table 250. This may correspond to the change in weight of data processing by the rule by replacing one variable with a similar linked variable in variable mapping table 250.

Thereafter, rule cost compute module 210 may be used in runtime with rule authoring application 130 to provide variable mapping table 250. Rule cost compute module 212 may display variable mapping table 250 to one or more of rule writers 202 to allow for optimized selection of variables and optimized rule authoring. This may include look-up and search functions, as well as autosuggestions based on selection of a variable and/or entry of the variable to a rule during rule writing. Additionally, once a rule is constructed, rule cost compute module 212 may analyze the rule as a whole and determine an optimized construction using variable mapping table 250, including suggestions of variable replacements in order to reduce processing costs and weights of the rule based on variable selection. Rule cost compute module 212 may also analyze preconstructed rules and/or existing rules to determine if new variables may be used to reduce a rules processing cost by detecting lower weighted variables for interchanging within the rule. In some embodiments, a processed vocab repository 242 may be output by rule optimization application 210 for viewing and monitoring by a service owner 206, such as to perform further optimization of variable selection during rule authoring, as well as revising the variables for a corresponding specification and vocabulary.

FIG. 3A is an exemplary diagram 300a of table showing variables used for rule authoring and construction mapped to other variables for rule authoring optimization, according to an embodiment. Diagram 300a includes variable correlations 310 determined by a service provider for use in correlating variables for a vocabulary used in rule authoring, such as when using service provider server 120 in system 100 of FIG. 1 for rule authoring. In this regard, variable correlations 310 may be further used with the table of FIG. 3B to provide variable mapping table 250 in system environment 200 of FIG. 2.

In diagram 300a, variable correlations 310 correspond to a table having an autogenerated mapping based on variable definitions. For example, a variable definition may correspond to a description or identifier (including correlation IDs for data and/or data objects) that is associated with each variable. The definition may be parsed in order to determine if variables are correlated and linked. For example, a variable definition may include "account first name," and may further include a resource used to load the account first name in certain embodiments. Thus, variables that include the same or similar definition or identifier, e.g., account first name, may be used in order to correlate one or more identifiers. However, in other embodiments, different data may be used to determine variable correlations 310, such as by identifying and correlating a corresponding data object, data loaded by each variable, or another variable functionality for each variable.

For example, variable correlations 310 include a variable column 320 and a mapped variable column 330. Variable correlations 310 include five variables, a variable 321, a variable 322, a variable 323, a variable 324, and a variable 325. In variable column 320, a first row include variable 322 mapped to variable 321 in the mapped variable column 330. This may be based on the description or identifier for variables 321 and 322. For example, variables 321 and 322 may both load data for the account first name, however, variables 321 and 322 may do so from different resources. Similarly, variable 323 is shown as mapped to variable 321 as well, and therefore, variable 323 may also load the account first name but also do so from a different resource. In a third or bottom row, variable 325 in variable column 320 is shown mapped to variable 324 in mapped variable column 330. As variables 324 and 325 are linked and mapped together, variables 324 and 325 may also load the same data, albeit from different resources (e.g., a transaction amount). Variables 321-325 may correspond to different data objects for account data, transaction data, user data, device data, and the like. Thus, each of variables 321-325 may have a different corresponding weight on the service provider's computing system, platform, and/or architecture, as shown in FIG. 3B.

FIG. 3B is an exemplary diagram 300b of a table showing variables weights and additional data processing parameters for optimizing rule authoring and processing, according to an embodiment. Diagram 300b includes variable weights 312 determined by a service provider for use in determining a processing cost, time, and/or weight on a service provider system by a variable in a rule, such as when executing rules and processing data using rule by service provider server 120 in system 100 of FIG. 1. In this regard, variable weights 312 may be further used with the table of FIG. 3A (e.g., variable correlations 310) to provide variable mapping table 250 in system environment 200 of FIG. 2.

In diagram 300b, variable weights 312 correspond to a table having processed variable statistics and parameters used to determine a weight of each variable on the computing resources of the service provider's systems when a rule is executed. For example, each of variables 321-325 in variable column 320 include different statistics determined from monitoring variable usage over time in different rules of the service provider's decision services. In a load mechanism column 340, a load mechanism for each of variables 321-325 is shown, such as the resource used to fetch and load data to a rule. A time to load column 350 displays a time (in ms) for loading of data by each of variables 321-325 to the rule. A time to transform column 360 may correspond to a time required to transform data retrieved by each of variables 321-325 into a format or data type used by the rule in data processing. A space complexity factor column 370 may correspond to an amount of working storage, space, or memory needed by each of variables 321-325 when loading and/or processing data in a rule.

Thereafter, a final weight column 380 shows the calculated weights based on load mechanism column 340, time to load column 350, time to transform column 360, and space complexity factor 370 column 370. This may correspond to a weight average based on columns 340-370 (as well as any other data columns and/or data points for statistics of variables 321-325). Final weight column 380 therefore includes a weight of each of variables 321-325, which may be used with variable correlations 310 to determine variable mapping table 250 and therefore compare variables and select an optimized variable based on processing costs and the corresponding weights. In some embodiments, data from time to load column 350 may be given a highest priority or weight in the corresponding score for final weight column 380, however, other weights may also be applied based on the requirements of the service provider.

For example, variable 322 is mapped to variable 321 in variable correlations 310. However, variable 322 has a weight of 2 in final weight column 380, while variable 321 has a weight of 1. Thus, variable 321 is more optimized and has a lower processing cost. This is also seen in variable 323 mapped to variable 321, as well as variable 325 mapped to variable 324, where variable 321 and variable 324, respectively, have lower weights and are more optimized for rule writing. Additionally, variables weights 312 may further include a variable occurrence in rules column 390, which may be used to determine how often a variable is used across rules of the service provider's decision services. In some embodiments, variable occurrence in rules column 390 may be used for optimizing other rules and reducing processing cost based on different weights of the variables.

Figure 4:
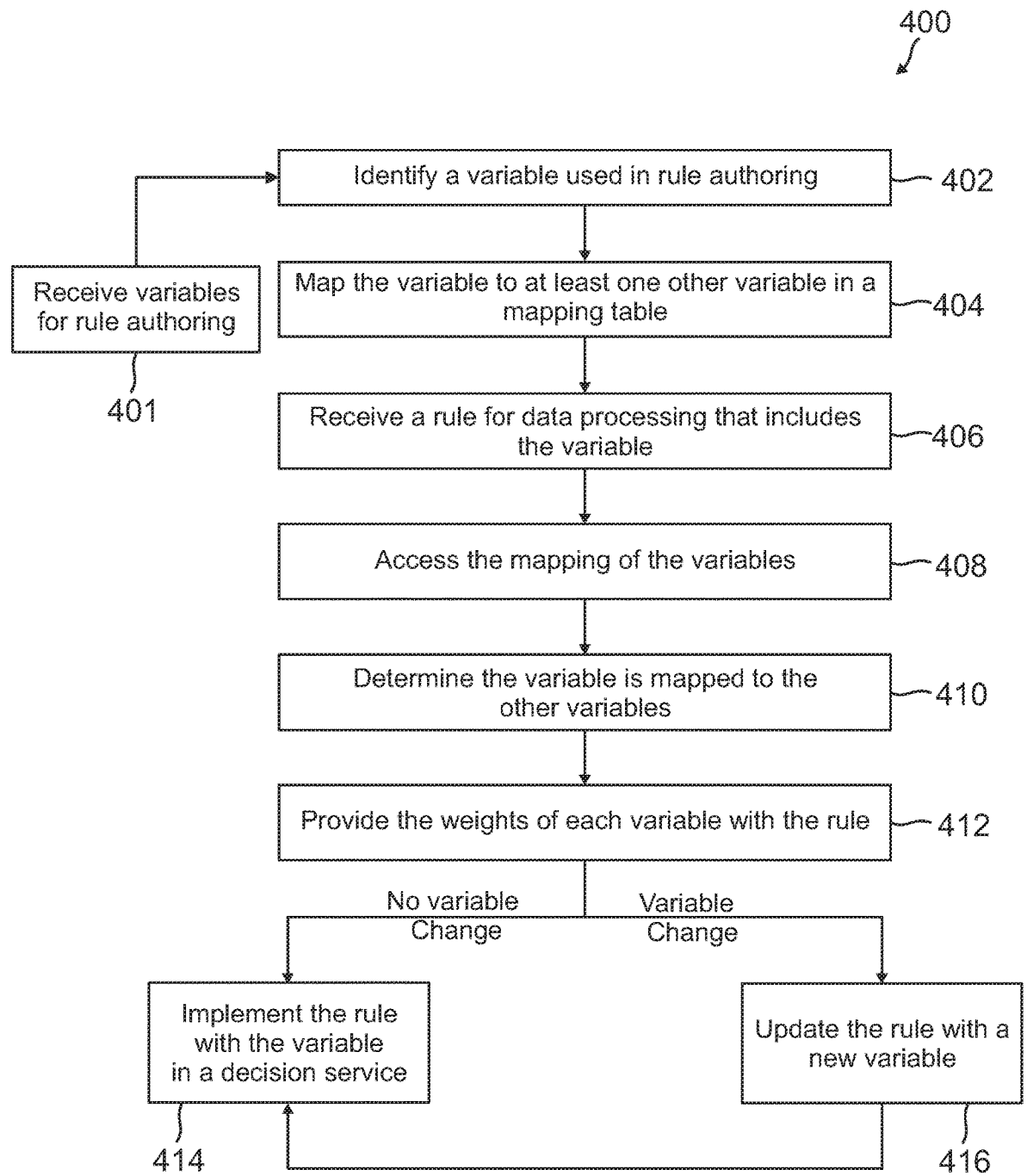
FIG. 4 is a flowchart of an exemplary process for determining processing weights of rule variables for rule processing optimization, according to an embodiment.

FIG. 4 is a flowchart 400 of an exemplary process for determining processing weights of rule variables for rule processing optimization, according to an embodiment. Note that one or more steps, processes, and methods described herein of flowchart 400 may be omitted, performed in a different sequence, or combined as desired or appropriate.

At step 402 of flowchart 400, a variable used in rule authoring is identified. The variable may be identified when a new RBO/RDO specification having a vocabulary of variables used for rule authoring and construction is provided and/or published to a rule authoring application. In other embodiments, the variable may be identified as a new variable that is updated with the specification and/or published to the specification after the specification is in-use for rule authoring. Thus, in some embodiments, at step 401, variables for rule authoring are received, such as when the specification is implemented for rule authoring and/or when a specification or rule is later analyzed for optimization in rule authoring based on variable weights. Once identified, at step 404, the variable is mapped to at least one other variable in a mapping table. Variables may be mapped by parsing descriptions or definitions of the variables and associating the variables based on terms, identifiers, or other information within the variables. For example, a description or identifier may identify the corresponding data object that is loaded to a rule using the variable. However, in other embodiments, other information may be used, such as the corresponding function of the variable, correlation IDs for data loaded by a variable, and the like. When performing the mapping, a mapping table may also include weights or other data associated with a data processing cost of each variable may also be stored for variable comparison and optimization in variable selection and rule authoring.

At step 406, a rule for data processing that includes the variable is received, such as a data processing rule used with data objects that may be used for data processing and decision-making by a decision service. For example, a data object for a variable may specify particular data require for rule data processing, including data for an account, user, device, transaction, and the like. The rule may include at least one variable, as well as multiple variables that may function together for data processing and decision-making. Once the rule is received, at step 408, the mapping of the variables is accessed, where the mapping shows linked variables having the same or similar functions or operations for data loading and/or processing. The mapping further includes the corresponding weights for the variables, such as a calculated weight for each variable based on the variables runtime statistics or parameters. These weights may be used to determine an impact on processing cost, time, or resources caused by use of the variables in rule authoring and data processing by the rules.

The variable is then mapped to one or more other variables, at step 410. For example, one or more other identifiers is identified using the mapping, which shows the variables that have the same or similar function to the identified variable from step 402. The variable(s) correlated to the initially identified variable may therefore be used interchangeably within the rule based on the data object that performs the data loading/processing within the rule. With determining the other mapped variable(s), at step 412, the weights of each variable are provided with the rule, such as to show optimization of the rule. This may include showing the individual weights of each variable, as well as a change (e.g., weight increase or decrease) caused by interchanging each variable with a different linked or mapped variable. Further, a total weight change and/or savings may be shown based on a most optimized rule from the most efficient or best weighted variables for a rule. In some embodiments, the weights may be provided during rule construction, or may be shown after rule construction and when a rule is reviewed and/or deployed/promoted for use in a decision service.

If no variable change occurs, such as if the identified variable is the most optimized for a rule and/or requested for rule construction, then at step 414, the rule is implemented with a decision service. For example, the rule may be deployed with a decision service in order to provide automated decision-making by the decision service with a computing service or application of the service provider. However, if a variable change is requested for the identified rule based on a mapped variable, at step 416, the rule is updated with the new variable. This allows for optimized construction of the rule based on a lower or more beneficially weighted variable. The rule may therefore have a lower overall weight and processing cost of the rule having the replaced variable. In some embodiments, the variable may automatically be changed or replaced to perform optimization of the rule, for example, by interchanging with another variable that allows for the same or similar data processing. However, in other embodiments, authorization and/or a replacement request may be required from the rule author prior to interchanging and/or replacing different variables within the rule.

Figure 5:
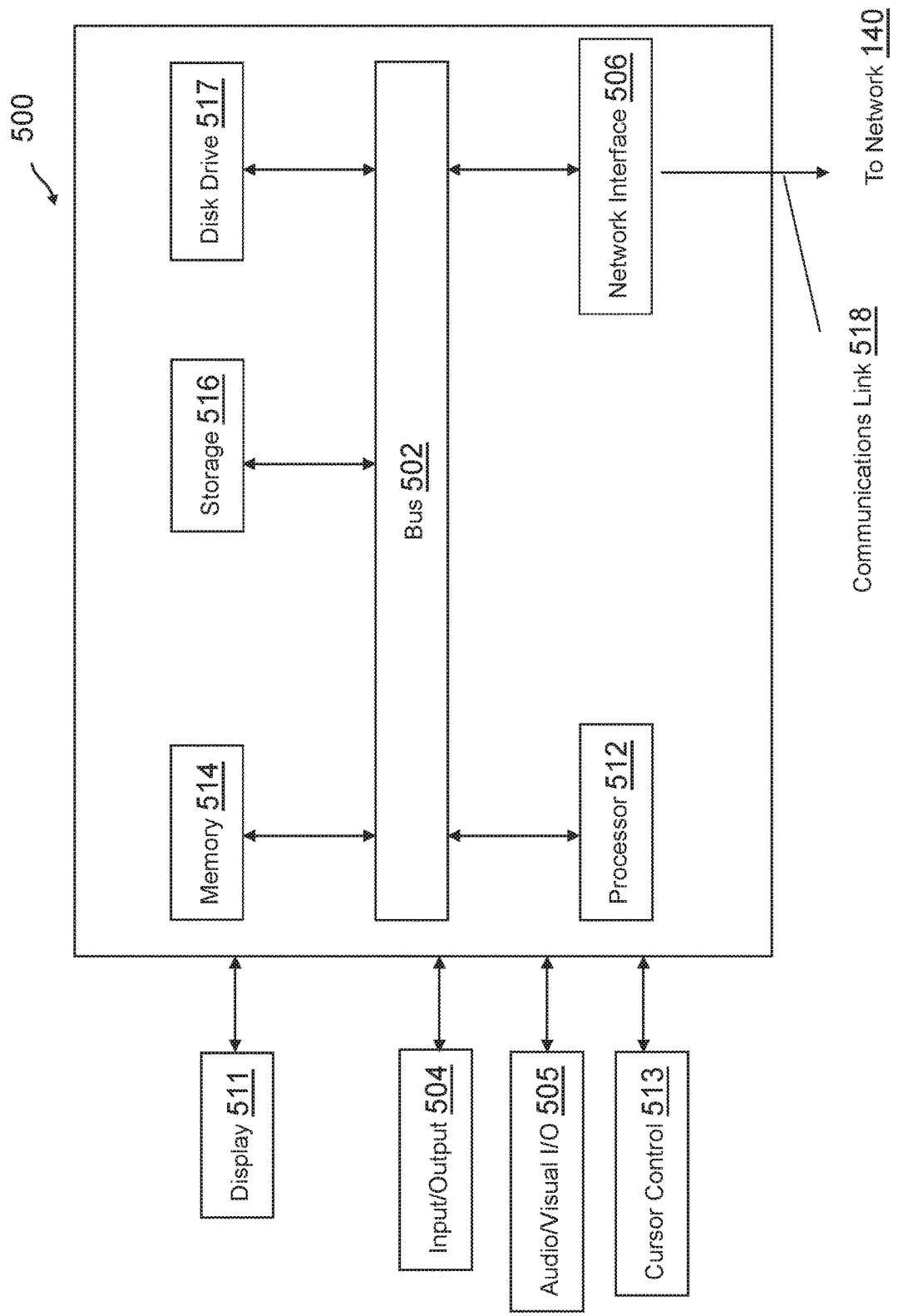
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for optimizing comprising:
   accessing, by one or more processors via a rule authoring application, a rule for a data processing operation associated with an online digital platform of a service provider, the rule having a plurality of variables;
   determining, by the one or more processors via the rule authoring application, a plurality of alternate variables to a first variable of the plurality of variables, the first variable being analyzed for optimization based on mappings of the first variable to the plurality of alternate variables usable with the rule, and the rule enabling a data processing operation on the online digital platform;
   determining, by the one or more processors via the rule authoring application, a plurality of alternate constructions of the rule using a subset of the plurality of alternate variables for the first variable in the rule based on the data processing operation and the mappings;
   accessing, by the one or more processors via the rule authoring application, attributes for the first variable and the subset of the plurality of alternate variables, the attributes indicating historical data use by each of the first variable and the subset of the plurality of alternate variables when used in other rules of the online digital platform for data processing in data processing computing services monitored over a period of time;
   determining, by the one or more processors via the rule authoring application, a respective plurality of weights for the plurality of alternate variables based on a first arrangement of the attributes for the plurality of alternate variables, the first arrangement selected via the rule authoring application; and
   determining, by the one or more processors via the rule authoring application, an optimization for the first variable from the plurality of alternate variables based on the plurality of weights and the plurality of alternate constructions.

2. The method of claim 1, wherein the determining of the plurality of alternate variables is further based on determining correlations for the mappings between the first variable and the plurality of alternate variables, each of the correlations indicating a similarity of functionality of each of the plurality of alternate variables to the first variable.

3. The method of claim 1, wherein the determining of the plurality of alternate variables is further based on determining correlations for the mappings between the first variable and the plurality of alternate variables, each of the correlations indicating a similarity of respective data objects used by each of the plurality of alternate variables to data objects used by the first variable.

4. The method of claim 1, further comprising:
   selecting, by the one or more processors via the rule authoring application, a single attribute from the attributes for a greater weight in the optimization; and
   modifying, by the one or more processors via the rule authoring application, the first arrangement to reflect the greater weight of the single attribute.

5. The method of claim 1, further comprising:
   monitoring, by the one or more processors via the rule authoring application, data usage attributes for the first variable and the alternate variables in a plurality of rules over a period of time, wherein the historical use is based, at least in part, on the monitored data usage attributes.

6. The method of claim 1, wherein the attributes comprise, for each of the plurality of alternate variables, a respective time to load data for a respective data object to a plurality of rules that utilize the respective data object, a respective time to transform the data for the respective data object in the plurality of rules, or a respective space complexity factor of the respective data object with the plurality of rules.

7. The method of claim 1, further comprising:
determining, by the one or more processors via the rule authoring application, one of the mapping of the first variable to a second variable of the plurality of alternate variables available to the rule authoring process for creating the rule based on a rule business object (RBO) specification or a rule data object (RDO) specification associated with creating the rule.

8. The method of claim 1, further comprising:
responsive to the determining of the optimization, replacing, by the one or more processors via the rule authoring application, the first variable with a first alternate variable from the plurality of alternate variables, the optimization indicating the first alternate variable from the plurality of alternate variables; and
deploying, by the one or more processors via the rule authoring application, the rule having at least the first alternate variable with a decision service for the online digital platform.

9. The method of claim 1, further comprising:
generating, by the one or more processors via the rule authoring application, an optimized vocabulary for the rule authoring application based, at least in part, on the optimization for the first variable.

10. A device, comprising:
a non-transitory memory storing instructions; and
a processor configured to execute the instructions to cause the device to:
determine to optimize at least one variable of a plurality of variables for a rule used by a ruleset of a service provider for an online digital platform, the ruleset including a plurality of rules including the rule that is constructed using interactions between the plurality of variables, the rule enabling a data processing operation on the online digital platform;
determine a mapping of a plurality of alternate variables to a first variable of the plurality of variables that is used for the rule;
determine a plurality of alternate constructions of the rule using a subset of the plurality of alternate variables for the first variable in the rule based on the data processing operation and the mapping;
access attributes for the first variable and the subset of the plurality of alternate variables, the attributes indicating historical data use by each of the first variable and the subset of the plurality of alternate variables when used in other rules of the online digital platform for data processing in data processing computing services monitored over a period of time;
determine a respective plurality of weights for the plurality of alternate variables based on a first arrangement of the attributes for the plurality of alternate variables, the first arrangement selected via the rule authoring application; and
update the mapping based on an optimization for the first variable from the plurality of alternate variables based on the plurality of weights and the plurality of alternate constructions.

11. The device of claim 10, wherein determining the mapping is based on determining correlations for the mappings between the first variable and the plurality of alternate variables, each of the correlations indicating a similarity of respective data objects used by each of the plurality of alternate variables to data objects used by the first variable.

12. The device of claim 10, wherein determining the mapping is based on determining correlations for the mappings between the first variable and the plurality of alternate variables, each of the correlations indicating a similarity of functionality of each of the plurality of alternate variables to the first variable.

13. The device of claim 10, wherein executing the instructions further causes the device to,
analyze the ruleset to select a single attribute from the attributes for a greater weight in the optimization; and
modify the first arrangement to reflect the greater weight of the single attribute.

14. The device of claim 10, wherein executing the instructions further causes the device to,
monitor data usage attributes for the first variable and the plurality of alternate variables in a plurality of rules over a period of time, wherein the historical use is based, at least in part, on the monitored data usage attributes.

15. The device of claim 10, wherein executing the instructions further causes the device to,
responsive to updating of the mapping, replace the first variable with a first alternate variable from the plurality of alternate variables, the optimization indicating the first alternate variable from the plurality of alternate variables; and
deploy the rule in the ruleset, the rule having at least the first alternate variable with a decision service for the online digital platform.

16. A non-transitory machine-readable medium having instructions stored thereon, the instructions executable to cause performance of operations comprising:
determining to optimize at least one variable of a plurality of variables for a rule used by a ruleset of a service provider, the ruleset including a plurality of rules including the rule that is constructed using interactions between the plurality of variables, the rule being configured for a data processing operation on the online digital platform;
determining a mapping of a plurality of alternate variables to a first variable of the plurality of variables that is used for the rule;
determining a plurality of alternate constructions of the rule using a subset of the plurality of alternate variables for the first variable in the rule based on the data processing operation and the mapping;
accessing attributes for the first variable and the subset of the plurality of alternate variables, the attributes indicating historical data use by each of the first variable and the subset of the plurality of alternate variables when used in other rules of the online digital platform for data processing in data processing computing services monitored over a period of time;
determining a respective plurality of weights for the plurality of alternate variables based on a first arrangement of the attributes for the plurality of alternate variables, the first arrangement selected via the rule authoring application; and
replacing, in the ruleset and based on an optimization indicating the first alternate variable from the plurality of alternate variables usable based on the plurality of alternate constructions, the first variable with a first alternate variable from the plurality of alternate variables.

17. The non-transitory machine-readable medium of claim 16, wherein the operations further comprise:
updating the mapping based on the optimization for the first variable from the plurality of alternate variables.

18. The non-transitory machine-readable medium of claim 16, wherein the determining the mapping is based on determining correlations for the mappings between the first variable and the plurality of alternate variables, each of the correlations indicating a similarity of respective data objects used by each of the plurality of alternate variables to data objects used by the first variable.

19. The non-transitory machine-readable medium of claim 16, wherein the determining the mapping is based on determining correlations for the mappings between the first variable and the plurality of alternate variables, each of the correlations indicating a similarity of functionality of each of the plurality of alternate variables to the first variable.

20. The non-transitory machine-readable medium of claim 16, wherein the operations further comprise:
   generating an optimized vocabulary for the rule authoring application based, at least in part, on the optimization for the first variable, wherein the optimized vocabulary is based on a combination of at least two of the plurality of variables within the rule.

\* \* \* \* \*